May 8, 1951  C. P. SORENSEN  2,552,066
FASTENING DEVICE

Filed Oct. 12, 1944  2 Sheets-Sheet 1

INVENTOR.
Carl P. Sorensen
BY
Donald W. Farrington
ATTORNEY

May 8, 1951  C. P. SORENSEN  2,552,066
FASTENING DEVICE
Filed Oct. 12, 1944  2 Sheets-Sheet 2

INVENTOR.
Carl P. Sorensen
BY
Donald W. Farrington
ATTORNEY

Patented May 8, 1951

2,552,066

UNITED STATES PATENT OFFICE 2,552,066

FASTENING DEVICE

Carl P. Sorensen, Middle River, Md., assignor to The Glenn L. Martin Company, Middle River, Md., a corporation of Maryland Application October 12, 1944, Serial No. 558,299

10 Claims. (Cl. 24—217)

My invention relates to an improved fastening device and more particularly a fastener that includes an arched receptacle and a serrated stud arranged to quickly and easily secure and lock together under tension securing parts of an assemblage.

This invention fulfills the need for a fastener that is self aligning, quickly and easily positioned, exerts a firm grip of high strength, has variable holding positions and is inexpensive to produce. These characteristic features are especially desirable in a fastener used by the aircraft industry on turret dome assemblages and for securing wing gun cradles, cowling, flooring and inspection plates, and other like applications.

Heretofore most of the fasteners developed have been limited to certain applications due to their limited holding strength or their inherent characteristic of being restricted to the holding of materials of a given thickness. These limitations have proved a severe handicap on those installations where the loading is heavy, or where there is a variation in the thickness of the parts being secured, or when it is desirable that the retaining means be loosely but definitely positioned for alignment purposes prior to final assembly.

The present invention provides a flat-sided serrated stud in cooperation with a receptacle constructed and arranged with tongues extending inwardly to receive, hold, and lock said serrated stud in various positions under tension. The entire length of the stud being serrated allows the stud to be loosely secured against removal, forming a loose attachment to prepositioning of the stud which is very desirable for quick alignment of the apertures in a large surface area, especially when installed over a curved surface, such as the cowling of an aircraft. To complete the assembly each stud is driven into a final position, under the required tension, by a simple axial thrust-like motion. Both operations can be accomplished very quickly by the use of an ordinary screw driver or like tool.

The receptacle design is one characterized by great strength due to the deposition of the stud-holding tongues and one which is well adapted to multiple or stacking assemblages where increased strength is required.

A further characteristic of the present invention is that the critical parts, such as the head of the stud and the receptacle mounts are proportioned to conform to existing Government standards and specifications for quickly removable fasteners as used on aircraft, thereby permitting ready interchange with other standard fasteners. This change can be made as a service operation on aircraft inasmuch as the rivet mounting holes in the receptacle of my fastener will align with the rivet apertures employed to mount current standard fasteners. The stud employed in the instant invention is also suited for mounting in a dimpled apertured sheet corresponding to that specified for current existing standards and thus a further advantage in my invention appears with its interchangability with current standard fasteners.

It is among the objects of the present invention to provide an improved means for fastening one element to another, wherein a receptacle carried by one element is shaped to receive and hold a solid serrated stud carried by the other element, the receptacle and stud constructed and arranged so that slight rotative movement between the stud and receptacle frees the stud of the receptacle.

Another object of the invention is to provide a means according to the preceding object for holding parts together in a preliminary position with the stud having certain of its serrations engaged by the receptacle and wherein the parts may be held in a final position with the receptacle engaging other serrations.

A further object is to provide a holding means consisting of a serrated stud and a retaining receptacle wherein the receptacle comprises a stack of substantially duplicate parts constructed and arranged so that the stud-retaining effect of the stack exceeds the stud-retaining effect that would be obtained by the same number of parts acting individually.

Another object of the invention is to provide a holding means according to the preceding objects that is interchangeable with current standard fasteners.

Figure 1:
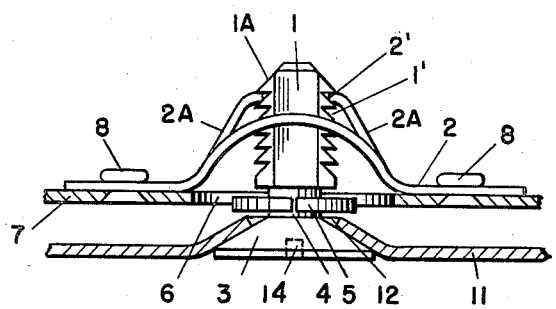
Figure 1 is a sectional view of two plates showing the fastener of this invention in position of preliminary engagement.

Referring to Figure 1, I have illustrated the fastener of my invention with the structure which carries the fastener in preliminary position and ready to be driven home or thrust, into final locked position. The stud 1 has a rectangular shank corresponding in cross section generally to the rectangular aperture 9 of receptacle 2. For purposes of description the greater dimension of the shank as measured between the serrated faces 1' will be referred to as the major axis, and the lesser dimension as the minor axis. Two opposite sides of said stud are formed smooth and the other two sides have serrated surfaces. The shank at the base of the slotted head 3 is grooved as at 4 to receive and retain a spring ring 5. The stud is of greater length than that required for full engagement in its final locked position to allow for loose engagement as a preliminary step in positioning, which loose engagement is utilized to attain a quick perfect alignment of the secured materials. The stud is also preferably case hardened to be more wear resistant, and may be center drilled for lightness.

The retainer receptacle 2 comprises a strip preferably of spring metal formed to provide an arch extending over the aperture 6 in the material 7 to which it is attached by rivets 8 or the like. In certain applications attachment by spot welding may be preferred, due to its low cost, and in other applications where field removal, or replacement, is anticipated bolts as an attachment means may prove more desirable. The crown of the arched portion of the receptacle is provided with a rectangular aperture 9 and parallel slots 10 extend downwardly from said crown away from two sides of the aperture 9 to form tongues 2ª having edges 2' adapted to fit into the buttressed grooves of the serrated surfaces 1' of stud 1. The proportions and arrangement of the tongues 2ª is such that the distance along the minor axis across the aperture 9 is less than the major axis of stud 1 measured from the bottoms of the grooves of serrated sides 1' so that when stud 1 is pushed or rotated into preliminary position (Figure 1) the tongue edges 2' are resiliently snapped into said grooves in the serrated surfaces 1' locking the stud 1 against casual removal. Thereafter the stud is suited for further axial movement to a final position.

To hold the stud assembled with the surface material carrying it the stud 1 is provided with a retainer 5 of spring wire formed to fit loosely in groove 4 at the base of head 3 of the stud 1. This arrangement serves to hold the stud 1 loosely in aperture 12 of surface material 11 prior to assembly of the stud with the receptacle. In those installations where a part, such as a cowl, door or the like is frequently removed in the field under adverse conditions by unskilled labor it is preferred that means such as above described be used to retain the stud with the part removed. It will be understood, however, that other forms of stud retaining means may be used and that in certain installations the retaining means may be dispensed with entirely.

The variable holding positions attainable by my invention are utilized to quickly bring the materials to be secured into finally secured position by the provision of a large opening 6 so that the inside of the receptacle functions as a funnel to guide the stud into aperture 9. The chamfered end portions 1ª of the stud cooperate with the guiding function of the receptacle so that the serrated faces 1' are presented to the locking tongues rather than at right angles thereto.

Figure 2:
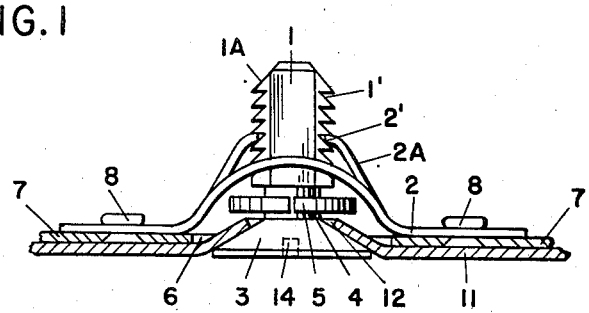
Figure 2 is a sectional view of two plates held together by the fastener in position of final engagement.
Figure 3:
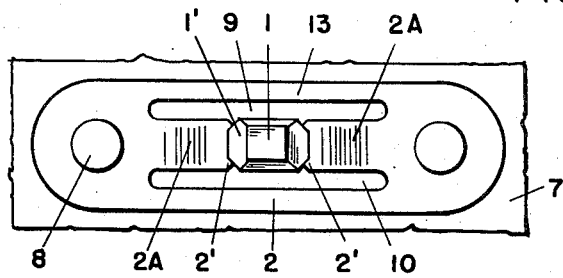
Figure 3 is a top plan view of Figure 2 showing fastener in final locked position.
Figure 4:
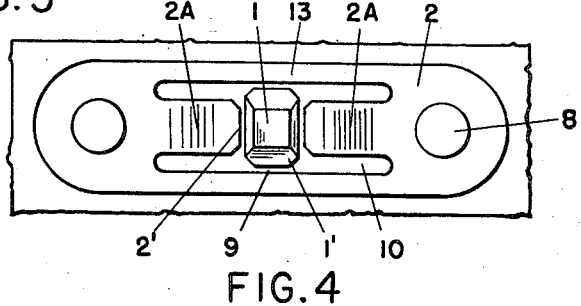
Figure 4 is a top plan view of Figure 2 showing fastener in unlocked position.
Figure 5:
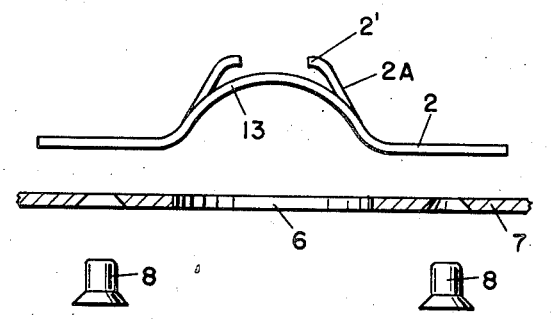
Figure 5 is an exploded sectional view of the receptacle assembly including a section of the material which carries the receptacle.
Figure 6:
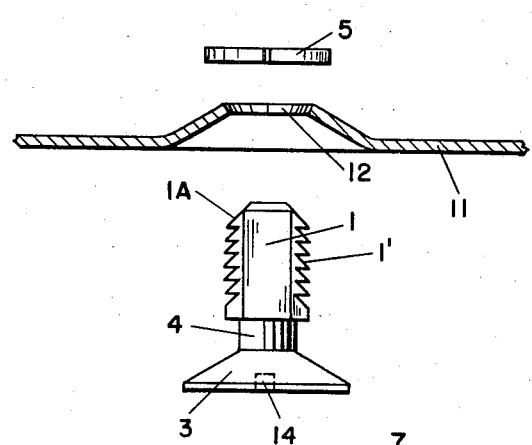
Figure 6 is an exploded sectional view of the stud assembly including a section of the material which carries the stud.
Figure 7:
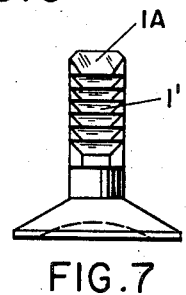
Figure 7 is a side view of the rectangular serrated stud showing one of the serrated sides.

To position the fastener to final locked holding position from the preliminary, or aligning, position illustrated in Figure 1, the stud is driven home, or thrust, to the position of Figure 2 where it is securely latched against removal by the tension of holding tongues 2ª engaged in buttressed notches of serrated surfaces 1'. The serrated sides 1' of the stud 1 are spaced to cooperate with the holding tongues 2ª so that positive engagement is secured even though the stud 1 is presented in a misaligned position with respect to the tongues so that one tongue engages a serration offset with respect to the serration engaged by the other tongue. This provides for secure holding of the parts even though it is necessary that the stud 1 be inserted to final position at an angle other than normal to the tongues 2ª. A further advantage flowing from the use of resilient tongues is that in the event the stud 1 is presented to the receptacle 2 slightly tilted with respect to the plane of the material 7 carrying the receptacle 2, the tongues 2ª will twist slightly to accommodate such tilting. The head 3 is formed to bear against and hold material 11 against the other material 7. In the illustrations I show metal to metal contacts between the materials, however, it is to be recognized that in certain applications it may be desirable to place a gasket, or the like, between the materials which are to be fastened together.

The high load bearing characteristic achieved according to my invention are associated with the solid rectangular shank of the stud which presents a large bearing surface of the serration extending along the edge of the spring retaining tongue. The advantage of this type of fastener over a round shank fastener will appear when it is appreciated that the round shank can only present a small segment of a circle to a spring retaining clip.

Figure 8:
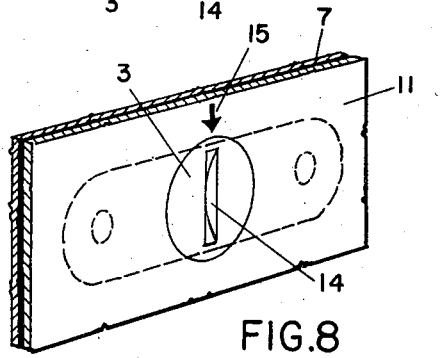
Figure 8 is a perspective fragmentary view of two plates held together by the fastener showing the slotted head of the fastener stud in alignment with indicia on the stud plate showing the stud to be in locked position.

A means for positive indication of the locked, or unlocked position of the stud 1 may be provided by indicia such as 15 on the surface material 11 showing alignment of the slot 14 in the head 3 indicating the locked position (Figure 8).

Release of stud 1 from the locked holding position is accomplished by rotating the stud a quarter turn either to the right or left by means of a screw driver or like tool inserted in slot 14 of head 3. This rotative action of the stud 1 forces the tongues 2ª away from each other disengaging the holding edges 2' from the serrated surfaces 1' and presents the smooth surfaces of the stud 1 to the edges 2' which permits quick withdrawal of stud 1.

I have found that fastener installation made according to my invention employing a ⅜ inch stud and a receptacle made of stock .032 inch thick successfully withstood a sustained pull of 900 pounds. In said installation the stud release was quickly and easily effected by a quarter turn with a screw driver.

Figure 9:
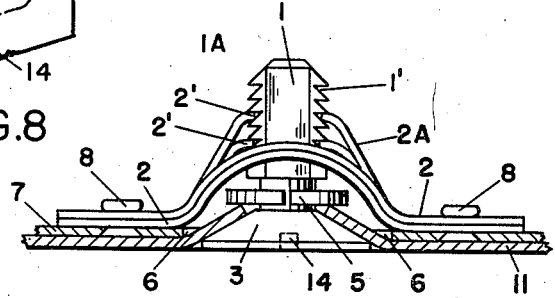
Figure 9 is a sectional view of a modified form of the fastener in locked position showing use of two receptacles in stacked relationship.

According to my invention the load bearing, or pull out resistance, of the fastener may be increased in a novel manner by stacking, or duplicating, the receptacle 2 for engagement with a single stud. I have found that by stacking substantially duplicates of the receptacle element a cooperation between the stacked elements is established so that the load bearing ability of the superimposed element is increased or supplemented by the element therebeneath. The result is that the combined load bearing effect of the two stacked receptacles is more than twice that of either element taken alone. In describing and illustrating (Figure 9) this modified form of my invention the use of two receptacles is considered as the preferred stacked arrangement, however, it will be understood that in certain applications a greater number may be used.

Although two forms of my invention have been shown and described in detail, and its environment referred to as aircraft assemblages, it will be appreciated that certain colorable changes in structure and environment may be made without departing from the spirit and scope of the appended claims.

I claim as my invention:

1. A fastener comprising a stud having a head and shank, said shank having a polygonal cross section with two opposed sides being serrated and the other sides being smooth, a receptacle to receive the shank of said stud comprising an arched metal strip having a polygonal opening formed at the crown thereof, two opposite sides of the opening being formed by tongues, the polygonal opening in the receptacle being proportioned with respect to the polygonal shank of said stud so that the tongues engage and hold the serrated sides of the shank against rotation and against withdrawal axially when the stud is within the receptacle in one position and the stud is freed of the tongues for axial withdrawal when turned on its axis to a position angularly displaced from said one position.

2. A fastener comprising a stud having a head and shank, said shank having a rectangular cross section with the narrow sides being serrated and its broad sides being smooth, a receptacle to receive the shank of said stud comprising an arched metal strip having a rectangular opening formed at the crown thereof, two opposite sides of said opening being formed by inwardly extending resilient tongues, the rectangular opening in the receptacle being proportioned with respect to the rectangular shank of said stud so that the tongues engage and hold the serrated sides of the shank when the stud is inserted within the receptacle in one position and the serrated sides of the stud are freed of the tongues when turned to a position displaced 90° from said engaged position.

3. A fastener for securing a plurality of parts together comprising a stud having a head and shank carried by one part, said shank having a polygonal cross section with two opposed sides being serrated and the other sides being smooth, a receptacle carried by another part to receive the shank of said stud comprising an arched metal strip having a polygonal opening formed at the crown thereof, two opposite sides of the opening being formed by tongues, the polygonal opening in the receptacle being proportioned with respect to the polygonal shank of said stud so that the tongues engage and hold the serrated sides of the shank against rotation and against withdrawal axially when the stud is within the receptacle in one position and the stud is freed of the tongues for axial withdrawal when turned on its axis to a position angularly displaced from said one position, said stud carrying part and the stud being provided with means indicating the angular relation between the sides of the stud and the tongues.

4. A fastener comprising a stud having a head and a shank with a rectangular cross section, said shank having its two narrow sides serrated throughout the major portion of the shank and its two broad sides smooth throughout the major portion of the shank, a receptacle formed to receive the shank of said stud comprising an arched metal strip having a rectangular opening formed at the crown thereof, two opposite sides of said opening being formed by arcuately and inwardly extending resilient tongues having straight edges adapted for engagement with the serrations of said shank, the rectangular opening in the receptacle being proportioned with respect to the rectangular shank of said stud so that the tongues resiliently engage and hold the serrated sides of the shank at any point along the length thereof when the stud is inserted within the receptacle with the serrated sides presented to said tongues, said stud being thus locked against removal in any one of a number of positions of engagement as may be determined by the depth of insertion of the stud, whereby the fastener is adapted to secure parts together which vary in thickness throughout a relatively wide thickness range.

5. A fastener comprising a stud having a head and shank, said shank having a rectangular cross section with its narrow sides being serrated and its broad sides being smooth, a receptacle to receive the shank of said stud comprising a plurality of arched metal strips arranged in nested formation with each strip having a rectangular opening formed at the crown thereof, two opposite sides of said opening formed by inwardly extending resilient tongues, the rectangular openings in the receptacle being aligned and proportioned with respect to the rectangular shank of said stud whereby the tongues engage and hold the serrated sides of the shank when the stud is inserted within the receptacle in one position and the stud is freed of the tongues when turned to a position disposed 90° from said engaged position.

6. A fastener comprising a stud having a head and shank, said shank having a polygonal cross section with two opposed sides being serrated and the other sides being smooth, a receptacle to receive the shank of said stud comprising a plurality of arched metal strips each having a polygonal opening formed at the crown thereof, two opposite sides of said opening formed by inwardly extending resilient tongue edges, the polygonal opening in the receptacle being aligned and proportioned with respect to the polygonal shank of said stud whereby the tongue edges engage and hold the serrated sides of the shank when the stud is inserted within the receptacle in one position and the stud is freed of the tongues when turned to a position disposed 90° from said engaged position.

7. A fastener comprising a stud having a head and shank, said shank having a rectangular cross section with its narrow sides being serrated and its broad sides being smooth, a receptacle to receive the shank of said stud comprising a plurality of arched metal strips each having a rectangular opening formed at the crown thereof, two opposite sides of said opening formed by inwardly extending resilient tongues, the rectangular openings in the receptacle being aligned and proportioned with respect to the rectangular shank of said stud so that the tongues resiliently engage and hold the serrated sides of the shank at any point along the length thereof when the stud is inserted within the receptacle with the serrated sides presented to said tongues, said stud being thus secured against rotation and locked against removal in any one of a number of positions of engagement as may be determined by the depth of insertion of the stud, whereby the fastener is adapted to secure parts together which vary in thickness throughout a relatively wide overall thickness range, and said stud is freed of the tongues for axial withdrawal when turned on its axis to a position angularly displaced from said positions of engagement.

8. A fastener comprising a stud having a head and shank, said shank having a rectangular cross section with two opposed sides being transversely serrated and the other opposed sides being smooth, said serrations extending substantially across the said first sides, a receptacle to receive the shank of said stud comprising an arched metal strip having a rectangular opening formed at the crown thereof, two opposite sides of said opening being formed by arcuately and inwardly extending resilient tongues, said tongues extending substantially the full length of the serration, the rectangular opening in the receptacle being proportioned with respect to the rectangular shank of said stud so that the tongues engage and hold the serrated sides of the shank when the stud is inserted within the receptacle in one position and the serrated sides of the stud are freed of the tongues when turned to a position displaced 90° from said engaged position.

9. A fastener comprising a stud having a head and shank, said shank having a rectangular cross section with two opposed sides provided with transverse serrations near the end of the shank for prepositioning and transverse serrations on the shank near the head for final positioning and the other opposed sides being smooth, a receptacle to receive the shank of said stud comprising an arched metal strip having a rectangular opening formed at the crown thereof, two opposite sides of said opening being formed by arcuately and inwardly extending resilient tongues having straight edges adapted for engagement with said transverse serrations of the shank, the rectangular opening in the receptacle being proportioned with respect to the rectangular shank of said stud so that the tongues engage and hold the transversely serrated sides of the shank when the stud is inserted within the receptacle in preliminary and final engaged positions and the serrated sides of the stud are freed of the tongues when turned to a position displaced angularly from said engaged positions.

10. In a fastening means for fastening one element to another, a stud having a head and rectangular shank, said shank having its narrow sides serrated transversely of the length of the shank and its broad sides smooth, a receptacle adapted to receive the shank of said stud comprising an arched metal strip mounted on one of said elements and having a rectangular opening formed at the crown thereof, two opposite sides of said opening being formed by straight end edges of resilient tongues arranged transversely of the shank, the rectangular opening being proportioned with respect to the rectangular shank of said stud so that the straight edges of said resilient tongues engage the entire length of a serration on each side of the shank in successive positions of insertion, locking against removal of the shank at any point throughout its serrated extent whereby the fastener effects a locked preliminary position and a locked final position determined by the extent of axial movement of the stud into the receptacle, said stud being adapted to be freed of the tongues when turned to a position 90° from any of said engaged positions.

CARL P. SORENSEN.

REFERENCES CITED

The following references are of record in the file of this patent:

UNITED STATES PATENTS

| Number | Name | Date |
| --- | --- | --- |
| 422,250 | Pullin | Feb. 25, 1890 |
| 1,243,859 | Neider | Oct. 23, 1917 |
| 1,467,335 | Roy | Sept. 11, 1923 |
| 1,890,348 | Whitehead | Dec. 6, 1932 |
| 2,140,064 | Tinnerman | Dec. 13, 1938 |
| 2,200,702 | Oddie | May 14, 1940 |
| 2,230,916 | Tinnerman | Feb. 4, 1941 |
| 2,238,664 | Tinnerman | Apr. 15, 1941 |
| 2,325,295 | Zaleske | July 27, 1943 |
| 2,352,982 | Tomalis | July 4, 1944 |
| 2,416,873 | Gorfin | Mar. 4, 1947 |
| 2,454,223 | Shippee | Nov. 16, 1948 |

FOREIGN PATENTS

| Number | Country | Date |
| --- | --- | --- |
| 65,394 | Switzerland | of 1913 |